Sept. 30, 1969 W. D. PETERSON ET AL 3,470,475

AUTOMATIC FREQUENCY DISCRIMINATORS AND CONTROL FOR A PHASE-LOCK LOOP PROVIDING FREQUENCY PRESET CAPABILITIES

Filed Sept. 28, 1966 2 Sheets-Sheet 1

INVENTORS
William D. Peterson
Arthur J. Kline, Jr.
BY
Mueller, Aichele & Rauner
ATTY'S.

Sept. 30, 1969 W. D. PETERSON ET AL 3,470,475

AUTOMATIC FREQUENCY DISCRIMINATORS AND CONTROL FOR A PHASE-LOCK LOOP PROVIDING FREQUENCY PRESET CAPABILITIES

Filed Sept. 28, 1966 2 Sheets-Sheet 2

INVENTORS
William D. Peterson
Arthur J. Kline, Jr.

BY

Mueller, Aichele & Rauner

ATTY'S.

United States Patent Office 3,470,475
Patented Sept. 30, 1969

3,470,475

AUTOMATIC FREQUENCY DISCRIMINATORS AND CONTROL FOR A PHASE-LOCK LOOP PROVIDING FREQUENCY PRESET CAPABILITIES

William D. Peterson, Phoenix, and Arthur J. Kline, Jr., Scottsdale, Ariz., assignors, by mesne assignments, to the United States of America as represented by the Administrator of the National Aeronautics and Space Administration Filed Sept. 28, 1966, Ser. No. 582,609
Int. Cl. H04b 1/06, 1/38
U.S. Cl. 325—63 17 Claims

ABSTRACT OF THE DISCLOSURE

An automatic frequency control system providing automatic pre-setting of a phase-lock loop to a desired center frequency by using a closed-loop electronic frequency discriminator, and holding the phase-lock loop to such center frequency until phase-lock is achieved. The frequency pre-setting system utilizes a digital frequency discriminator plus a reference signal in a digital type non-linear frequency lock loop. The digital frequency discriminator control signal alters the phase-lock loop so that the loop is preset to a given or selected center frequency and oscillated above the center frequency in looking for or attempting to find the received signal. The phase-lock loop transfer characteristics are modified only slightly by the additional presetting circuitry enabling the phase-lock loop to operate normally after phase lock to the signal, thereby overriding the frequency preset. The reference signal may be provided by another communication channel.

This invention relates to automatic frequency control (AFC) systems for use with devices operating on radio waves subject to large Doppler shifts, and particularly to such systems wherein a receiver has its frequency generating means preset to an expected received frequency wherein the phase-lock loop automatically adjusts to the frequency of the received wave, when received. The invention described herein was made in the performance of work under a NASA contract and is subject to the provisions of section 305 of the National Aeronautics and Space Act of 1958, Public Law 85–568 (72 Stat. 435; 42 USC 2457).

Previous phase-lock loops have been constrained so as to provide an automatic lock-in sufficient to accommodate both the uncertainty factor of the incoming frequency and equipment frequency drifts. In many applications, it has been found desirable to construct a phase-lock loop having narrow-band filter characteristics, while still being capable of tracking or locking to a received signal varying in frequency by a factor which is large relative to the band width of the particular phase-lock loop. Such applications include operations with spacecraft phase-lock tracking receivers operating with a large frequency uncertainty due to a high Doppler shift caused by high relative velocities in addition to the usual equipment frequency drifts.

In initially operating receivers, it is desirable to preset the receiver frequency to the expected Doppler shifted frequency. Previous techniques utilized to provide presetting a phase-lock loop include manual frequency adjustment of the phase-lock loop by an operator utilizing some apriori information. With changeable Doppler shifts, an operator cannot always satisfactorily preset a phase-lock loop.

Automatic acquisition of an incoming signal frequency has been accomplished by sweeping the oscillation frequency of the receiver oscillator over a range of frequencies in attempting to acquire a signal. Such frequency sweeping has been performed with mechanically operated variable capacitors and voltage controlled oscillators. In using such techniques there is no guarantee that the first acquired signal will be a desired signal. Such reliable signal acquisitions are particularly important in spacecraft communications such that a so-called frequency sweep approach is not satisfactory.

Accordingly, it is an object of this invention to provide an automatically preset phase-lock loop.

It is a further object of this invention to provide a preset phase-lock loop which automatically holds to an expected frequency until phase-lock is achieved and then automatically ignores the pre-setting.

It is another object of this invention to provide a preset phase-lock loop utilizing digital techniques.

It is still another object of this invention to provide a preset phase-lock loop whose operating transfer characteristics are modified only slightly by the preset circuitry.

It is a still further object of this invention to provide in a multi-channel communication system frequency presetting between channels having different characteristics of signal transmissions.

This invention provides automatic presetting of a phase-lock loop to a desired center frequency by using a closed-loop electronic frequency discriminator, and holding the phase-lock loop to such center frequency until phase-lock is achieved. In one form, the frequency presetting system utilizes a digital frequency discriminator plus a reference signal in a digital type non-linear frequency-lock loop. The digital frequency discriminator control signal alters the phase-lock loop such that the loop is preset to a given or selected center frequency and oscillated about the center frequency in looking for or attempting to find the received signal. Such action is sometimes termed "dithering." The phase-lock loop transfer characteristics are modified only slightly by the additional presetting circuitry enabling the phase-lock loop to operate normally after phase-lock to the signal thereby overriding the frequency preset. Further, the reference signal may be provided by another communication channel.

Referring now to the accompanying drawing, wherein.

Figures 1, 2:
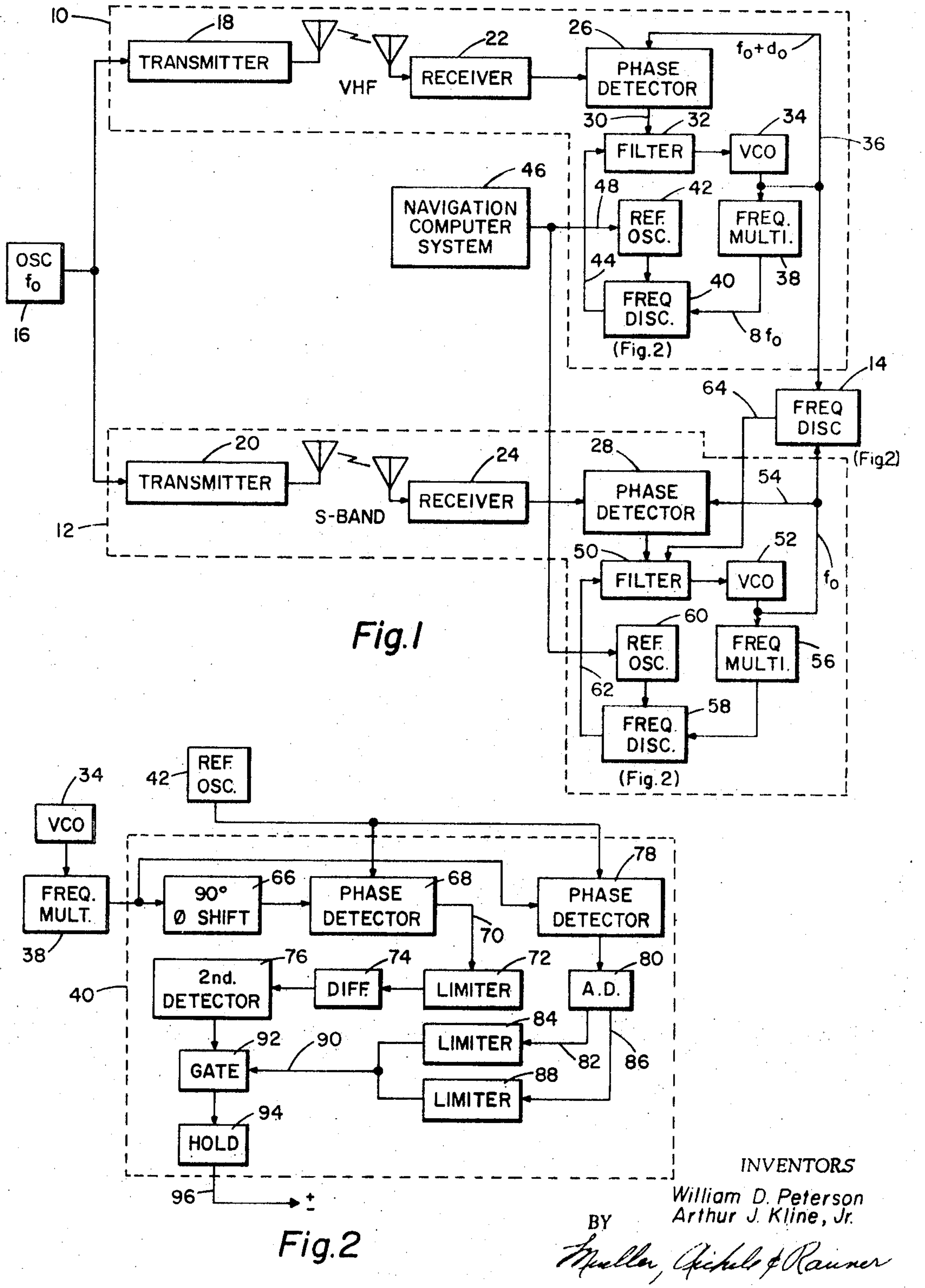
FIG. 1 is a block diagram showing a system utilizing the teachings of this invention wherein two communication links are automatically preset to desired frequencies, with one communication link having a stronger received signal and after locking-on, automatically presets the receiver in a second communication channel.
FIG. 2 is a block diagram of a frequency discriminator system usable with the FIG. 1 embodiment.

In a phase-lock loop a phase detector compares the received wave with a local VCO (voltage controlled oscillator) generated wave and supplies a phase-error signal through a tracking filter to adjust the VCO frequency such that the phase error output of the detector is reduced to zero. According to this invention, the output of the VCO, in addition to being applied to the just mentioned phase detector, is also supplied to a frequency discriminating circuit wherein it is compared with a reference frequency. This reference frequency is related to the desired center frequency of the expected received wave. The frequency discriminator supplies a digital output signal indicative of the phase comparison. That is, when the VCO frequency is below that of the reference frequency, a digital signal of a first polarity is provided; when the VCO frequency is above the reference frequency, the polarity of the provided control signal is reversed. Only when the frequency of the VCO crosses the desired center frequency will the polarity and therefore the control signal polarity be changed. The output control signal of the frequency discriminator is supplied to a tracking filter to act as an auxiliary input to adjust the VCO frequency. By properly adjusting the system components, the reference signal when added to the error signal of the phase detector will be subsumed into the phase-detector error output signal whenever phase-lock is achieved.

According to one embodiment of this invention, the output frequency of the VCO is multiplied, for example by a frequency multiplier which multiplies the frequency eight times, to increase the rate of response of the frequency discriminator. The frequency discriminator responds to the difference of the reference frequency and the multiplied VCO frequency. The operation of the frequency discriminator is such that the frequency relationship of the VCO and the reference is examined once each cycle of the difference frequency and a determination is then automatically made which signal is of a higher frequency. If, at the time of the decision, it has been determined that the relationship is unchanged from the previous examination time, the control signal remains in the same state. However, if it is determined that the frequency relation has reversed, the control signal polarity is also reversed. Therefore, this discriminator provides a maximum rate of frequency change in the VCO whenever the frequency is not locked on.

By using digital techniques, the VCO frequency oscillates about the desired center frequency (the VCO frequency is "dithered"). Such oscillations enhance the lock-on capability of the receiver. It should also be noted that the maximum delay in reversing the control signal output polarity is determined by the frequency relationship of the VCO and desired frequency; i.e., the delay is equal to the period of the difference frequency.

A priori information, as may be developed in a navigational computer, may be used to predict the received signal frequency and set the frequency of a reference oscillator, by known means, to predict the Doppler shift of signal frequency.

A digital control may be provided by using analog or amplitude type discriminators, then rectifying and amplitude limiting the phase errors provided by the frequency discriminators to selectively open a control signal gate for passing a signal to a hold or memory circuit, the amplitude limiting is used to impart digital characteristics to the control signal. Differentiating the phase error signal detects its point of zero crossover (the VCO frequency and the reference frequency are momentarily in phase). The output of the differentiator is used to open a gate for passing the amplitude limited phase-error signal derived from a 90° phase shifted signal derived from either the VCO or reference frequency.

The above discussion has been concerned with two-state controls. A four-state control may be also provided. For example, an amplitude detector is connected to an output of a phase detector and if the phase error signal is greater than a predetermined amplitude, a larger amplitude digital signal is then supplied to the VCO for increasing the rate of VCO frequency change. However, when the phase error signal is less than the threshold, a small amplitude digital signal is supplied to provide a slower rate of change in the VCO frequency.

Referring now to FIG. 1, there is illustrated, in block diagram form, a two-channel communication system utilizing the teachings of the subject invention. A first channel 10, typically in the VHF band, is characterized by having relatively strong signals while second channel 12, typically in the S-band, is characterized by relatively weak signals. Both channels include automatic frequency preset mechanisms according to teachings of this invention as will be fully described. Further, a frequency discriminator 14 at the receiver end of the channels is used to couple the two receivers such that when one receiver is frequency locked to its received signal, it automatically presets the receiver frequency of the other channel. It is desired that a common oscillator 16 at a transmitter station drive both transmitters 18 and 20, respectively, in the two channels. The transmitters 18 and 20 may be installed in a spacecraft while the receivers are at ground stations. Both transmitted signals are respectively received by the usual radio receivers 22 and 24 and provided to the phase detectors 26 and 28.

Phase deflector 26 provides a phase-error indicating signal over line 30 through tracking filters 32 which in turn controls the frequency of VCO 34. VCO 34 supplies its signal frequency over line 36 as one input to phase detector 26 to be compared with the phase of the receiver 22 supplied signal. The VCO signal frequency should be the frequency of oscillator 16, $f_o$, plus the Doppler shift, $D_o$, of the signals as related to the oscillator 16 frequency. It is to be understood that the VHF and S-band carrier signals will also be Doppler shifted, however, the effect at a given instant on the oscillator frequency $f_0$ will be the same both in the VHF and S-band.

VCO 34 also supplies its signal frequency to frequency multiplier 38 in a frequency preset circuit or loop which is constructed according to this invention. Multiplier 38 provides the VCO frequency as multiplied 8 times to frequency discriminator 40, which may be constructed as shown in either FIGS. 2 or 5. Reference oscillator 42 supplies a reference signal frequency to discriminator 40 such that an error signal over line 44 may be provided through tracking filter 32 to preset VCO 34 to a desired center frequency as represented by the reference oscillator 42 frequency. When the velocity of the spacecraft is predictable, a navigational computer system 46 may be used to provide a control signal over line 48 to preset reference oscillator 42 to a predicted frequency. Reference oscillator 42 also may be a voltage controlled oscillator.

Before a signal is received by receiver 22, phase detector 26 provides only noise signals over line 30, thereby possibly driving VCO 34 frequency out of range from the expected frequency. However, with reference oscillator 42 providing a desired center frequency to discriminator 40, which in turn provides an error signal over line 44 through tracking filter 32, VCO 34 is preset to the expected Doppler shifted frequency. The output signal of phase detector 26, during periods when no signal is being received by receiver 22, is kept small such as not to interfere with the preset operation. Phase detector 26 may include a gate (not shown) responsive to an AGC circuit (not shown) in receiver 22 that blocks the error signal when no signal is being received and opens when a signal is being received. However, when receiver 22 is receiving a signal, it supplies good signals to phase detector 26, which in turn then supplies strong error signals over line 30 which are summed with the signals with the control signal on line 44 to adjust VCO 34 frequency. Since the error signals are summed in tracking filter 32, the output control signal from discriminator 40 is combined with detector 26 signals resulting in a composite control signal.

The receiver portion of communication channel 12 is constructed in a similar manner to that of channel 10 and operates in an identical manner with tracking filter 50 receiving the phase error signal from detector 28 and supplying it to VCO 52. VCO 52 supplies its signal frequency over line 54 to phase detector 28 and to frequency multiplier 56. Frequency discriminator 58 receives the VCO frequency as multiplied 8 times and compares such received frequency with the output signal of reference oscillator 60. Discriminator 58 supplies its phase error signal over line 62 to tracking filter 50 for initial presetting of VCO 52. In the same manner, navigational computer system 46 may preset reference oscillator 60 as above described with respect to reference oscillator 42 (channel 10).

The two channels can cooperate with each other to preset channel 12, which receives a weak signal, to thereby enable faster acquisition of the transmitter 20 signals. To this end, frequency discriminator 14 receives the signal frequency from VCO 34 of channel 10. Since channel 10 quickly acquires the strong VHF signals, it can act as an auxiliary reference oscillator to channel 12. Discriminator 14 also receives the signal frequency from VCO 52 for comparing it with VCO 34 signal frequency. A control signal is then provided over line 64 as an input to tracking filter 60 for controlling the frequency of VCO 52. The three inputs to tracking filter 50, i.e., from lines 64, 62 and detector 28 are all summed before being applied to VCO 52. Alternatively, the auxiliary inputs may have switched lines therein and be disconnected from tracking filter 50 after frequency lock-on. Also, reference oscillator 60, frequency discriminator 58 and multiplier 56 may be dispensed with, making channel 10 provide all presetting functions.

An analog frequency discriminator having digital output signals is shown in FIG. 2. The operation of the discriminator is explained with respect to the receiver of communication channel 10, wherein reference oscillator 42 and VCO 34, respectively, supply their signal frequencies to frequency discriminator 40. VCO 34 has its signal frequency multiplied by multiplier 38 which in turn supplies the multiplied frequencies to 90° phase-shifting circuit 66. The phase-shifted signals are supplied to phase detector 68 wherein they are compared with the frequency of reference oscillator 42. The resultant phase-error indicating signals are supplied over line 70 to limiter 72. The amplitude of the output phase error signal is then amplitude limited. The output of the limiter 72 is then differentiated by differentiator 74. This differentiating action detects those momentary phase comparisons indicating zero phase differences. That is, when the reference oscillator frequency is somewhat different from the multiplied VCO frequency, the phases of the two signals will continually shift plus and minus and will periodically pass through zero phase differences at a rate equal to the difference in frequencies. Differentiator 74 supplies its output signal to second or amplitude detector 76 which amplitude detects the zero points referred to above.

Returning now to reference oscillator 42, the generation of the amplitude of the frequency control signal will now be described. Oscillator 42 provides its reference signal frequency to phase detector 78 wherein it is compared with the multiplied VCO frequency, with zero phase shift. The frequency difference signal is provided through amplitude detector 80 for detecting the magnitude of the frequency difference. When the magnitude is below a given threshold detector 80 supplies a signal over line 82 to first limiter 84. Limiter 84 limits the amplitude of the received signal to a first amplitude, for example one volt. If the frequency difference is greater than said threshold, detector 80 supplies a signal over line 86 to second limiter 88 which amplitude limits the signal to a second and larger amplitude, for example two volts. The output of the two limiters 84 and 88 are combined in line 90 and supplied through gate circuit 92 which is selectively opened by second detector 76. It should be noted that only one of the two limiters 84 and 88 will pass a signal at any given time since the phase error will either be above or below the threshold. Gate 92 passes the line 90 signal to hold circuit 94 which memorizes the polarity and amplitude of the provided signal and supplies the corresponding signal over line 96 to an input of tracking filter 32 (FIG. 1) where it is summed with the detector 26 phase-error signal on line 30. Hold circuit 94 may consist of a large capacitor which is charged by the output of gate 92 through a low impedance circuit and connected to filter 32 through a high impedance circuit over line 96, the details of which are not pertinent in the practice of the present invention.

Figure 4:
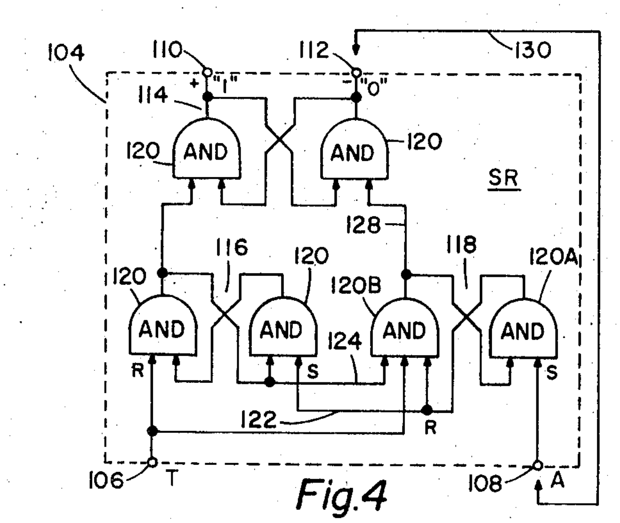
FIG. 4 is a block diagram of a so-called shift-register stage usable with a digital discriminator using the teachings of this invention.
Figure 3:
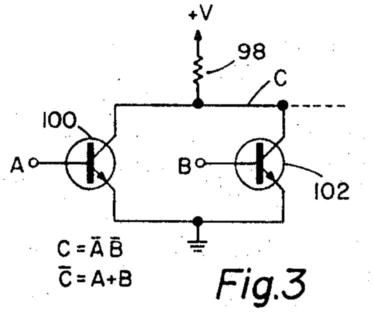
FIG. 3 is an abbreviated schematic diagram of a digital AND circuit usable with the present invention.

It is desired that a digital logic frequency discriminator be provided in certain situations, such a discriminator may be provided to supply the functions required in frequency discriminators 40, 58 and 14 (FIG. 1). Referring to FIGS. 3 and 4, there are shown two digital building blocks usable to construct a digital logic frequency discriminator. Referring particularly now to FIG. 3 there is shown an AND circuit consisting of load resistor 98 having one end connected to a positive supply potential; the other end connected to point C which is a common connection between the collectors of a plurality of transistors 100, 102, etc. The emitter electrodes of all the transistors are commonly connected to ground reference potential, making all the transistors in parallel circuit between point C and ground reference potential. It is easily seen that when one of the transistors is conducting, i.e., presents a low impedance, the voltage at point C will be substantially at ground reference (low) potential. Therefore, when point C is at ground reference (low) potential, is indicates an OR function is being performed. However, to make point C +V volts (high), all of the transistors 100, 102, etc. must be non-conductive thereby providing an AND function. The Boolean equations are set forth in FIG. 3 with the bar above the letter indicating a low voltage condition (ground) and letters without a bar indicating a high voltage condition (+V). In corresponding binary notations, the low voltage condition represents a binary zero while the high voltage condition (character without a bar) represents a binary one.

Figure 5:
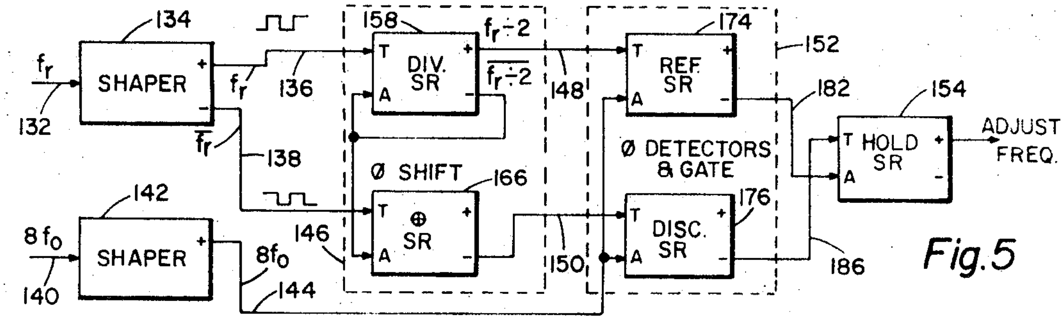
FIG. 5 is a block diagram of a digital logic discriminator providing digital type control signal and usable with the FIG. 1 embodiment and incorporating the circuits shown in FIGS. 3 and 4.

Referring now to FIG. 4, there is shown a shift-register stage used to construct the FIG. 5 discriminator. The various AND circuit elements shown in the shift register stage may be constructed with the FIG. 3 illustrated AND circuit. The functional characteristics of the shift register stage 104 is set forth below. When the input signal on terminal 106, hereinafter termed T, is high, the signal input to terminal 108, hereafter termed A, is ineffective to alter the memory contents of the shift register stage. However, when signal T on terminal 106 shifts or switches from its high to its low condition or state, the present state of A (high or low) is stored in the shift-register stage and indicated by the output portion. The output portion includes terminal 110 which when supplying a high voltage indicates a binary one is stored in the stage while the opposite stable state is indicated through second output terminal 112 carrying a high voltage which indicates a binary zero is stored. Correspondingly, when a binary zero is stored in the shift register stage, the output potential on terminal 110 is low and when a binary one is stored the output potential on terminal 112 is low. The potentials on terminals 110 and 112 are always opposite; as such, the signals are termed "complementary." Also the signal on terminal 112 is always opposite to that stored from input A; therefore, it is complementary thereto. The shift register stage consists essentially of three flip-flop arrangements, output flip-flop 114, reference flip-flop 116, and input flip-flop 118. Each flip-flop consists of two cross-coupled AND circuits generally denoted 120. Such cross-coupling is well known in the art. Input signal T is supplied to reset input portions, generally designated by "R" to both flip-flops 116 and 118. Input signal A is supplied to the set input portion of flip-flop 118, generally denoted S. Flip-flop 116 also receives a set input over line 122 from the flip-flop 118. Correspondingly, an input to the reset side (R) of flip-flop 118 is provided over line 124 from flip-flop 116. The significance of these two connections will become apparent. Flip-flop 114 is controlled by signals over lines 126 and 128 respectively from flip-flops 116 and 118.

The signal condition of shift register stage 104 is first described when terminal 106 has its input signal T high. Referring back to FIG. 3, it is seen that a high input signal causes a transistor 100, 102, etc. to be conductive and thereby provide a low output signal from the AND circuit. Therefore, when T is high, lines 124, 126 and 128 are low. Since both lines 126 and 128 are both low, flip-flop 114 remains in its previous state, storing either a one or zero. Line 128 signal being cross-coupled to the set input of flip-flop 118, its output signal supplied over line 122 is low, therefore, no matter what the signal state on terminal 108 is, it will have no effect on the shift register.

When the signal T changes from a high to a low state, the high or low state of signal A then present at terminal 108 is stored in shift register stage 104 and provided as an output signal. We will first examine the circuit operation of flip-flop 118. When T is high, line 128 is low. When 128 is low, AND circuit 120A passes signal A to line 122. Signal A is inverted in flip-flop 116 and is supplied in its normal polarity; that is, when A is high, line 126 is high; correspondingly, when A is low, line 126 is low. Line 126 is connected to line 124 and thence to the reset input R of flip-flop 118. When T returns to low, flip-flop 118 then assumes the state indicated by terminal 108 signal A. AND circuit 120B has now been opened to pass the signals on lines 122 and 124. First assume that A is low, then line 122 is high, closing AND circuit 120B making line 128 low. Therefore, flip-flop 118 assumes a state wherein line 128 is high and line 122 is low. Turning now to flip-flop 116, since line 122 is low, line 126 is also low forcing flip-flop 116 into a stable state represented by line 126 being high. Turning now to flip-flop 114, line 126 is high and line 128 is low. The high voltage on line 126 forces terminal 110 to be low thereby forcing terminal 112 to be high. Therefore a low input signal A appearing when signal T changes from high to low results in a binary zero output signal. Correspondingly, a high signal A on terminal 108 when T changes from high to low results in a high signal being supplied to line 128 and a low signal to line 126. Flip-flop 114 is then set to supply a high signal on line 110 indicating a binary one with a correspondingly low signal on terminal 112.

The FIG. 4 circuit may be used to divide a number of serially applied pulses by two by connecting binary zero output terminal 112 to terminal 108, as by line or jumper 130. It will be remembered that the voltage on terminal 112 upon a transition from high to low of signal T is opposite that of signal A found on terminal 108. For example, if signal A is high, then the resulting output signal on terminal 112 is low and vice versa. Since the circuit is only operative when signal 106 goes from high to low, the terminal 112 changes every cycle of the input wave to provide an output wave one-half the frequency of the input wave.

Figure 6:
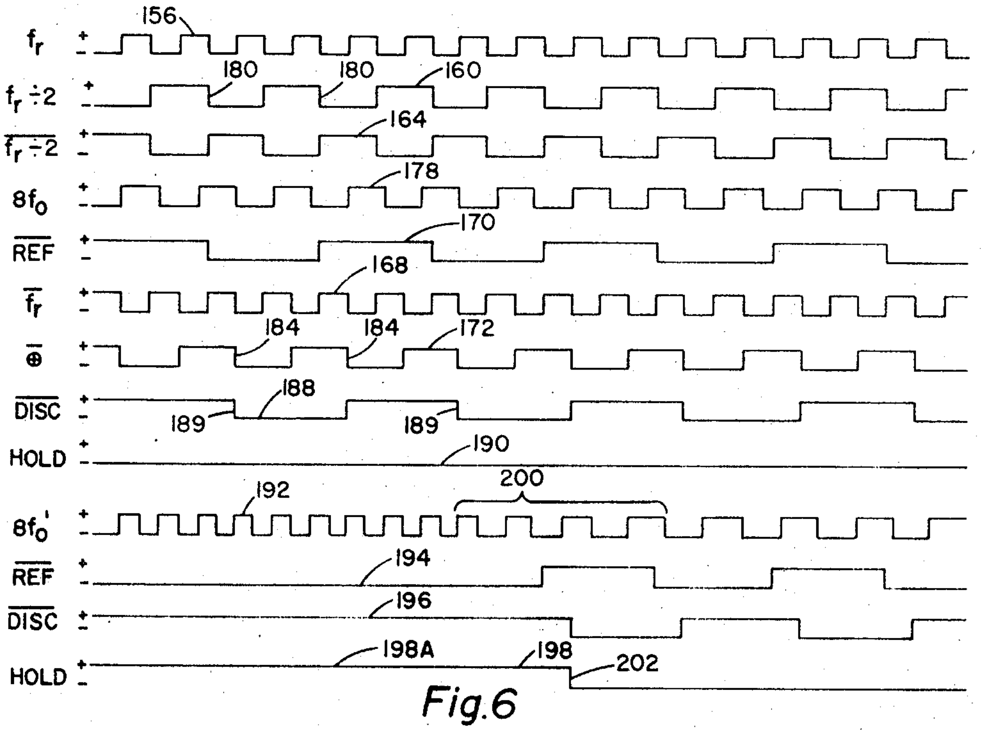
FIG. 6 is a timing diagram showing idealized wave forms as found in the FIG. 5 digital logic frequency discriminator.

Referring now to FIGS. 5 and 6, there is described a digital logic frequency discriminator usable with the present invention. This discriminator is characterized in that the output control signal for adjusting the frequency is digital in character. Also, an advantage of the described digital discriminator is its adaptation to the integrated circuit logic. For example, shift register stage 104 shown in FIG. 4 may be on one integrated circuit chip.

Reference frequency, $f_r$, is supplied over input line 132 as from reference oscillator 42 (FIG. 1). Shaper 134 forms pulses or rectangular waves from the input frequency and supplies in-phase output signals over line 136 and opposing-phase output signals over line 138. In a similar manner, the frequency-multiplied VCO signal is supplied over line 140 as from frequency multiplier 38 of FIG. 1. Shaper 142 shapes the received signals into rectangular waves and supplies the shaped pulses over line 144 for comparison with the reference frequency in the discriminator.

The discriminator consists of phase shifter 146 which receives the signals from shaper 134 for supplying two 90° phase-separated signals, respectively, over lines 148 and 150. The signals on line 148 are one-half the frequency of $f_r$ and are in-phase while the signals on line 150 are 90° shifted with respect to the input signal $f_r$. Phase detector and gate 152 receives the two phase-separated signals and compares them with the input signal $8f_o$. The resultant comparison signals switch hold shift-register stage 154 such that its output voltage will be constant whenever $8f_o$ has a first relation to $f_r$ and a second binary voltage of opposite polarity whenever $8f_o$ has a second relationship to $f_r$. The operation is such that hold shift register stage 154 remains in the same state until the frequency relationship between $f_r$ and $8f_o$ changes. Such action provides a binary digital control for a phase-lock loop.

The operation of the discriminator is best understood by referring to the idealized wave forms in FIG. 6 wherein rectangular waves 156 are found on line 136 at the T input of divide shift-register stage 158. Shift-register stage 158 is connected as shown in FIG. 4 with jumper 130 between the zero or negative (−) output portion and connected to the A input to provide a divide-by-two circuit. The line 148 supplied signal is wave 160 while the line 162 signal (the binary zero output of divide SR158) is wave 164. Wave 164 is supplied to the A input of exclusive OR shift register stage 166 while the T input of that stage receives the binary-zero output signal of shaper 134 as supplied over line 138 as shown in FIG. 6 as rectangular wave 168. Since the divide shift register stage 158 and the exclusive OR shift register stage 166 are timed at their T inputs by waves from shaper 134 that are 180° out-of-phase and the frequencies are divided by two, their respective output signals will be 90° phase-shifted with respect to each other as shown by waves 170 and 172 of FIG. 6. The 90° phase relationship may be arbitrarily changed by connecting line 150 to the plus or binary one output portion of the exclusive OR register stage 166. Also, the divide shift-register stage 158 may be connected to line 148 through its binary zero output stage portion to provide an alternate connection.

Referring now to the phase detector and gate 152, the in-phase wave 160 on line 148 is supplied to the timing input T of the reference shift-register stage 174. In a similar manner, the 90° phase-shifted signal on line 150 is supplied to the timing input T of the discriminator shift-register stage 176. The A signal inputs to the stages 174 and 176 both receive the VCO shaped signal 168 from shaper 142 as supplied over line 144. One mode of operation represented by $8f_o$ wave 178 in FIG. 6 having a frequency lower than that of the reference frequency $f_r$. The frequency difference is quite great in that $8f_o$ is 25 percent lower than $f_r$. Each time wave 160 on line 148 changes from the high to the low, such as at transitions 180, the polarity of wave 178 representing $8f_o$ is stored in reference shift register stage 174 with the opposite polarity being supplied over line 182 to the A input of hold shift register stage 154. Such action results in wave 170 shown in FIG. 6.

Shift register stage 176 receives wave 172, the binary zero output of the exclusive OR shift register stage 166, over line 150. It should be noted that wave 172 of 90° displaced from wave 160 and is one-half the frequency thereof. Each time wave 172 goes from a high to low such as at transitions 184, the signal state of $8f_o$ is transferred into shift register stage 176, inverted and applied over line 186 to the timing input T of shift-register stage 154. It should be noted in this particular illustration the output of shift reigster stage 176 is represented by low voltage line 188, indicating that the hold shift register state 154 is never switched from one state to the other. This is in accordance with the above teaching that as long as the frequency $8f_0$ remains lower that the reference frequency $f_r$, the output signal of the shift register stage 154 remains a constant potential, indicated by line 190 in FIG. 6.

In order to illustrate a change in frequency and the reaction of the shift register stage 154 thereto we have provided a variable frequency wave 192 which represents $8f_0$. With this latter wave the output of the discriminator shift register stage 176 is wave 194. The output of the reference shift register stage 174 is represented by wave 196 and the output signal of shift register stage 154 is wave 198. It may be noted that the reference waves derived from the reference frequency $f_r$ are always the same. Therefore, waves 156, 160, 164, 168 and 172 are used to explain the operation of the discriminator with respect to varying frequency waves 192, 194, 196 and 198. Examination of the wave forms with respect to the discriminator block diagram will show the mode of operation as referred to below. Wave 194 is derived from stage 174. Each time wave 160 has a high-to-low transition 180 the signal $8f_0'$, wave 192, on line 144 is sampled and stored in stage 174. The inversion of the signal 192 at times 180 appears on wave 194. Similarly, stage 176 supplies wave 196 over line 186, causing stage 154 to supply control signal 198. The first portion 198A indicates the VCO has too high a frequency. During time 200 (FIG. 6), $f_0'$ undergoes a rapid decrease in frequency, from 33% high to 25% low in three cycles. The discriminator rapidly responds, changing control signal 198, as at 202, to increase the frequency of $8f_0'$. The response of the discriminator to other changes in frequency are comparable.

What is claimed is:

1. An automatic frequency adjusting and presetting system for use in a signal translating system, including in combination, input means for receiving signal having a frequency subject to variations, a controlled oscillator to have its frequency of operation adjusted to the incoming frequency, a phase detector connected to said input means and said oscillator for receiving and comparing phases of signals therefrom and for providing a phase difference indicating signal, tracking filter means receiving said indicating signal and connected to said controlled oscillator for adjusting the frequency thereof according to said indicating signal, reference oscillator means providing a signal having a frequency related to that of an expected incoming signal frequency, a frequency multiplier connected to said controlled oscillator for multiplying the oscillator frequency a predetermined number of times, a frequency discriminator connected to said reference oscillator means and to said frequency multiplier for receiving the respective signals therefrom and providing a second indicating signal, and connected to said tracking filter means for supplying said second indicating signal thereto whereby said controlled oscillator is initially adjusted in freqcency to be approximately that of the expected incoming signal frequency.

2. The combination of claim 1 wherein said frequency discriminator provides digtal indicating signals, one indicating signal indicating a constant rate of increase in the controlled oscillator signal frequency and a second indicating signal indicating a decrease in the voltage controlled oscillator signal frequency, and said phase detector supplied indicating signal being summed with said frequency discriminator indicating signals in said filter.

3. The combination of claim 2 wherein said frequency discriminator provides a change in said digital signal according to the sign of the difference frequency between the incoming signal and the controlled oscillator signal, such that as the two signal frequencies approach each other, the rate of frequency change of said controlled oscillator remains constant until the oscillator frequency equals the incoming signal frequency.

4. The combination of claim 1 wherein said reference oscillator means includes a receiver oscillator in a second signal translating system independent of said frequency adjusting system, and further including second system input means for receiving a signal having a frequency subject to variations and related to the first mentioned input means received signal in that the received center frequency have a predetermined relationship, and phase-lock loop means in said second system for adjusting said receiver oscillator to said second system input means received frequency such that the frequency adjustment of the second system oscillator serves to provide a reference frequency to the first-mentioned controlled oscillator.

5. The combination of claim 4 wherein there is a transmitter oscillator having a modulating frequency, first and second transmitter means receiving the transmitter oscillator modulating frequency and operating at two different carrier signal frequencies such that the first system has a signal strength quite small with respect to the second system signal strength, and said second system acquiring the incoming signal first and adjusting its oscillator to said transmitter oscillator modulating frequency, and providing said transmitter oscillator modulating frequency to said frequency discriminator.

6. The combination of claim 5 further including Doppler frequency-shift predicting means connected to said reference oscillator means and to said second system for selectively presetting both systems to a predicted Doppler shifted reference frequency, and both oscillators of said systems operating on the same frequency.

7. The combination of claim 1 further including in said frequency discriminator a 90° phase-shifting means connected to said input means for shifting the received signal 90°, a phase detector connected to said phase shifting means and to said reference oscillator means for comparing the phase of the reference signal and the phase-shifted received signal, a second phase detector connected to said input means and to said reference oscillator means for comparing the phases of the reference signal and the received signal, means connected to the first mentioned phase detector in said discriminator for detecting the instant of the occurrence of zero phase difference between the frequencies being compared thereby, limiter means connected to said second phase detector for amplitude limiting any error signal supplied by said detector, gating means connected to said limiter and to said zero phase detecting means so as to be controlled by said zero phase detecting means and passing a signal from said limiter, to provide a binary output signal indicative of the frequency relationships of said reference oscillator means frequency and said input means received signal frequency.

8. The combination in claim 7 wherein said second phase detector includes threshold means for supplying a first frequency difference signal when the difference is below said threshold and supplying a second frequency difference signal when said difference is greater than said threshold, a second limiter connected to said second phase detector in parallel circuit relationship with the first mentioned limiter and said first mentioned limiter receiving said first signal and second limiter receiving said second signal, and the two limiters providing different amplitude limiting characteristics, such that digital signals of two different amplitudes are selectively provided through said gate means.

9. The combination of claim 1 wherein said discriminator includes frequency difference threshold means and is operative when the frequency difference as measured thereby is less than said threshold to supply digital signals for causing said adjusting means to adjust the loop tuning at a first rate and when the frequency difference is greater than said threshold to supply digital signals for causing said adjusting means to adjust the tuning at a rate greater than said first rate.

10. The combination of claim 1 wherein said frequency discriminator includes first and second pulse forming means respectively connected to said input means and to said reference oscillator means for receiving and forming the received signal into rectangular waves, phase shifting means connected to said first pulse forming means for receiving the first rectangular pulse formed signals and providing output signals which are shifted in phase with respect to each other approximately 90° and are derived from said first pulse former supplied signal, a phase detector connected to said phase shifting means for receiving said phase shifted signals and comparing said phase shifted signals with an input rectangular wave from said second pulse forming means and supplying a first set of control signals whenever said second pulse forming means repetitive pulse frequency is less than the first pulse forming means pulse repetitive frequency and a second set of control signals whenever said first pulse forming means pulse repetitive frequency is higher than the second pulse forming means pulse repetitive frequency, and holding means connected to said phase detector means and responsive to said first set of control signals to provide a delayed first binary signal output and responsive to said second set of signals to provide a delayed second binary signal output.

11. The combination as in claim 10 wherein said phase shifting means includes divide and exclusive-OR shift register stage means each having two inputs and at least one output, one of which provides a signal complementary to the polarity of the signal received on one of said inputs and responsive to a change in signal on another one of said inputs to store and supply on output signal having a complementary polarity to a signal then present on said first mentioned input, said another input on said divide stage being connected to said first pulse forming means and having a complementary output connected to said one input whereby the pulse repetitive frequency on said another input is divided by two and further having an output providing a non-complementary signal with respect to the input signal on said one input, said exclusive-OR stage having its one input connected to the complementary output of said divide stage and its said another input connected to said first pulse forming means such that the signal on said one input is stored, said stages providing a set of output control signals which are 90° out of phase with respect to each other, phase detecting means including a reference stage and a discriminating stage each characterized by having a timing input, a signal input and a complementary output portion, the signal inputs of both phase detector stages being connected to said second pulse forming means and the respective timing inputs being respectively connected to said divide and exclusive-OR stages for receiving the 90° phase shifted pulses, and said holding means comprising a shift register stage having a timing input and a signal input with the timing input receiving signals from said discriminator stage and the signal input receiving signals from said reference stage and having an output portion providing a signal indicative of the relationship of the pulse repetitive frequencies provided by said shapers.

12. A frequency discriminator, including in combination, reference signal frequency generator means, input means for receiving a signal having a frequency to be compared with said reference frequency, a 90° phase shifting means connected to said input means for phase shifting the received signal, a phase detector connected to said phase shifting means and to said reference frequency means for comparing the phase of the reference signal and the phase-shifted received signal, a second phase detector connected to said input means and to said reference frequency means for comparing the phases of the reference signal and the received signal, means connected to the first mentioned phase detector for detecting the instant of the occurrence of zero phase difference between said two frequencies, limiter means connected to said second phase detector for amplitude limiting any phase error signal provided by said detector, gating means connected to said limiter and to said zero phase detecting means and jointly responsive thereto to provide a binary output signal indicative of the frequency relationships of said reference frequency means and said input means frequencies.

13. The combination of claim 12 wherein said second phase detector includes threshold means for supplying a first phase error signal when the phase error is below said threshold and supplying a second phase error signal when the phase error is greater than said threshold, a second limiter connected to said second phase detector in parallel circuit relationship with the first mentioned limiter and the first mentioned limiter receiving a first phase error signal and said second limiter receiving said second phase error signal and the two limiters providing different amplitude limiting characteristics, such that a digital signal of two different amplitudes are selectively provided through said gate means.

14. A frequently discriminator, including in combination, first and second input means each having pulse forming means responsive to an input signal, phase shifting means connected to said first input means for receiving the first input means signals and providing output signals which are shifted in phase approximately 90° with respect to each other and derived from the first input means signals, a phase detector means connected to said phase shifter for receiving said phase shifted signals and comparing said phase shifted signals with an input signal from said second input means and providing a first set of control signals whenever said second input means signal frequency is less than the first input means signal frequency and a second set of control signals whenever the first means input signal is higher than the second means input signal frequency, and holding means connected to said phase detector means and responsive to said first set of signals to provide a delayed first binary output signal and responsive to said second set of signals to provide a delayed second binary output signal.

15. The combination as in claim 14 wherein said phase shifting means includes divide and exclusive OR shift register stage means each having two inputs and at least one output, one of which provides a signal complementary to the polarity of the signal received on one of said inputs and responsive to a change in signal on another one of said inputs to store and supply an output signal having a polarity complementary to a signal then present on said first mentioned input, said another input on said divide stage being connected to said first pulse forming means and having a complementary output connected to said one input whereby the pulse repetitive frequency on said another input is divided by two and further having an output providing a non-complementary signal with respect to the input signal on said one input, said exclusive OR stage having its one input connected to the complementary output of said divide stage and its said another input connected to said first pulse forming means such that the signal on said one input is stored, said stages providing a set of output control signals which are 90° out of phase with respect to each other, phase detecting means including a reference stage and a discriminating stage each characterised by having a timing input, a signal input and a complementary output portion, the signal inputs of both phase detector stages being connected to said second pulse forming means and the respective timing inputs being respectively connected to said divide and exclusive-OR stages for receiving the 90° phase shifted pulses, and said holding means comprising a shift register stage having a timing input and a signal input with the timing input receiving signals from said discriminator stage and the signal input receiving signals from said reference stage and having an output portion providing a digital signal indicative of the relationship of the pulse repetitive frequencies provided by said shapers.

16. A frequency discriminator employing logic switching circuits, including in combination, first input means respectively on first and second lines supplying a first set of complementary digital signals respectively on first and second lines and having a first repetitive frequency, second input means supplying digital signals having a second repetitive frequency, divide means including a flip-flop and connected to said first line and responsive to said first set digital signals thereon to supply through said flip-flop a second set of complementary digital signals having a repetitive frequency one-half of the first set repetitive frequency, exclusive OR means including a flip-flop and connected to said second line and to said divide means for receiving one of said second set digital signals and responsive to supplied digital signals to supply through said flip-flop a digital signal having a repetitive frequency one-half of said first signal set repetitive frequency and phase-shifted with respect to said second set digital signals, first bistable means connected to said divide means and to said second input means and responsive to a signal in said second set to selectively alter its stable state according to said second repetitive frequency signal, second bistable means connected to said exclusive-OR means and to said second input means and being responsive to said phase-shifted signal to selectively alter its stable state according to said second repetitive frequency signal, and third bistable means connected to said first and second bistable means and responsive to an alteration in stable states of one of said bistable means to selectively alter its bistable state according to the then stable state of another one of said bistable means, and the stable state to which the third means is altered indicating which input means signal frequency is highest.

17. The combination as in claim 16 wherein said first and second means are responsive respectively to said second set digital signal and said phase-shifted digital signal only when such digital signals which have at least two signal states are shifting between said digital states in a first direction.

References Cited

UNITED STATES PATENTS

| | | | |
|---|---|---|---|
| 2,858,425 | 10/1958 | Gordon | 328—134 |
| 2,878,448 | 3/1959 | Maxey | 324—82 |
| 2,906,866 | 9/1959 | Thompson | 325—346 |
| 3,123,772 | 3/1964 | Gerks | 325—67 |
| 3,124,799 | 3/1964 | Hagedorn et al. | 343—100 |
| 3,130,375 | 4/1964 | Rotier et al. | 331—10 X |
| 3,135,919 | 6/1964 | Heald | 325—320 |
| 3,241,084 | 3/1966 | Klingberg | 331—11 |
| 3,289,082 | 11/1966 | Shumate | 325—60 X |
| 3,308,387 | 3/1967 | Hackett | 328—134 X |

ROBERT L. GRIFFIN, Primary Examiner

B. V. SAFOUREK, Assistant Examiner

U.S. Cl. X.R.

325—67, 421; 328—134; 331—11